Jan. 14, 1930.

R. A. MORTON ET AL 1,743,679

CONVEYER

Filed Feb. 24, 1925

INVENTOR
ROLLA A. MORTON
EDWARD P. HENRY
ATTORNEYS

Jan. 14, 1930.   R. A. MORTON ET AL   1,743,679
CONVEYER
Filed Feb. 24, 1925   2 Sheets-Sheet 2
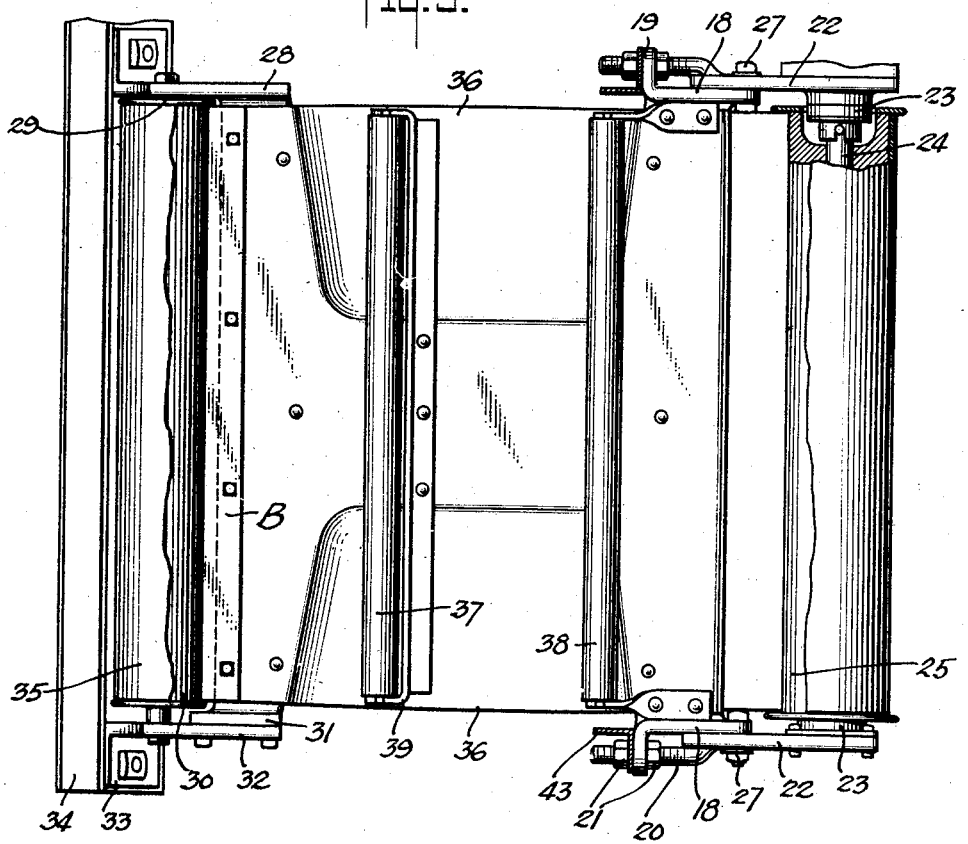
INVENTOR
ROLLA A. MORTON
EDWARD P. HENRY
ATTORNEYS Patented Jan. 14, 1930

1,743,679

UNITED STATES PATENT OFFICE

ROLLA A. MORTON AND EDWARD P. HENRY, OF LONG BEACH, CALIFORNIA, ASSIGNORS TO WESTERN WHEELED SCRAPER COMPANY, OF AURORA, ILLINOIS, A CORPORATION OF ILLINOIS

CONVEYER

Application filed February 24, 1925. Serial No. 11,232.

Our invention relates to conveyers, and more particularly to the subsidiary conveyer briefly described and illustrated in our co-pending application Serial No. 699,860, filed March 17, 1924.

It is a purpose of our invention to provide a conveyer which, in its application to the loading and grading apparatus embodied in our co-pending application, operates to convey earth from the plow to the main conveyer and without the possibility of becoming clogged or jammed.

It is also a purpose of our invention to provide a conveyer in which a deflector is interposed between the stretches of the endless belt comprised in the conveyer so as to deflect earth deposited between the stretches outwardly thereof and before the earth has an opportunity to fall between the lower roller and the belt, thus preventing accumulation of the earth between the roller and belt and eliminating the possibility of the earth jamming between such elements and preventing operation of the conveyer.

It is also a purpose of our invention to provide a conveyer in which any earth that might escape from the deflector and adhere to the surface of the lower roller will be automatically removed from the roller and conveyed to the deflector to be discharged from between the stretches of belt.

We will describe only one form of conveyer embodying our invention, and will then point out the novel features thereof in claims.

In the accompanying drawings

Figure 3 is a top plan view of the conveyer shown in the preceding views, with the upper stretch of belt broken away;

Figure 4 is a vertical sectional view taken on the line 4—4 of Figure 2;

Figure 5 is a detail view showing in top plan the frame embodied in the conveyer shown in the preceding views;

Figure 6 is a view showing in top plan the deflector embodied in the conveyer shown in the preceding views.

Similar reference characters refer to similar parts in each of the several views.

Figure 1:
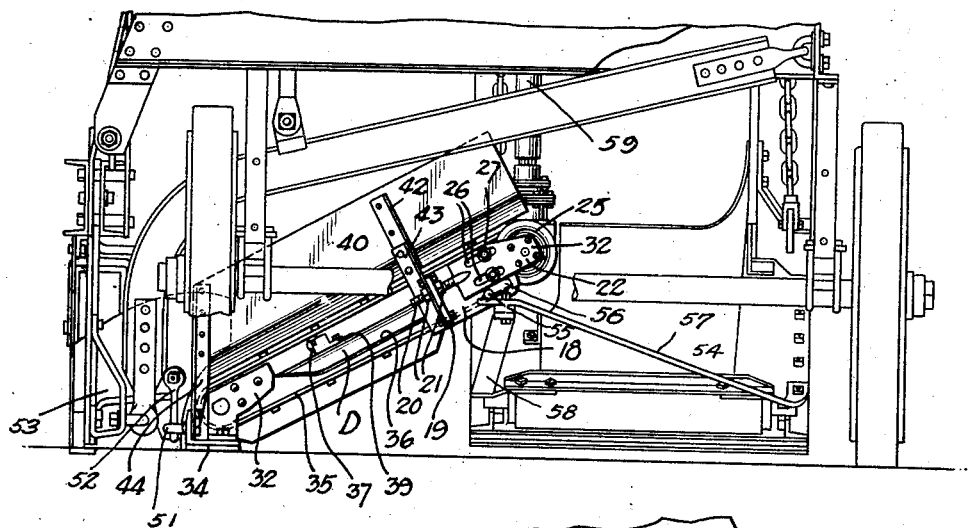
Figure 1 is a view showing in side elevation one form of conveyer embodying our invention in applied position to the loading and grading apparatus embodied in our co-pending application.

Referring specifically to the drawings, our invention in its present embodiment comprises an earth supporting frame designated generally at F and which, as shown in Figure 5, is substantially H-shaped, the frame including parallel portions 15 and 16 and an intermediate connecting portion 17. Welded or otherwise secured to the opposite ends of the portion 16 are bearing plates 18 having angular extensions 19 through which screw threaded rods 20 extend. The rods 20 are adjustable in the extensions through the medium of nuts 21, and these rods are secured to bearing plates 22 which support bearings 23 for the axle 24 of a driving roller 25. As shown in Figures 1 and 3, the bearing plates 22 are formed with slots 26, and bolts 27 extend through the slots and the plates 18 to co-operate with the rods 20 in providing adjustable supporting means for the bearing plates 22, whereby the roller 25 can be adjustably supported.

Again referring to Figure 5, it will be seen that one end of the portion 15 has welded or otherwise secured thereto a bearing plate 28 in which one end of a shaft 29 is journaled, the shaft carrying a roller 30. The opposite end of the portion 15 is formed with an upwardly extending lip 31 to which is bolted a bearing plate 32 for receiving the opposite end of the shaft 29 and permitting the removal of the shaft and roller when necessary by virtue of its connection with the lip 31. The bearing plates 28 and 32 are formed with angular extensions 33 to which is secured a shoe 34 adapted to have sliding contact with a roadway and serving to support the lower end of the entire conveyer.

Figure 2:
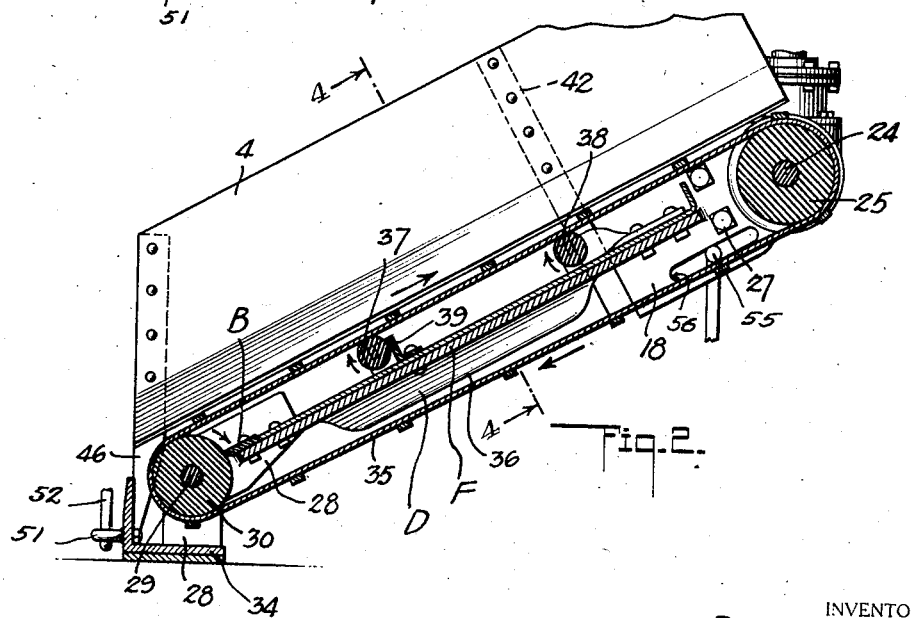
Figure 2 is a view showing in longitudinal section the conveyer shown in Figure 1.

An endless belt 35 is trained about the rollers 25 and 30, the roller 25 being adapted to be driven, while the roller 30 is merely an idler. The arrangement of rollers is such that the upper and lower stretches of the belt 35 are disposed above and below, respectively, the frame F, as clearly illustrated in Figures 2 and 4. The driving roller 25, as illustrated in Figures 1 and 2, is sustained in elevated position, and with the shoe 34 contacting with the roadway, it will be clear that the conveyer as a unit is supported in inclined position. The adjustable mounting of the bearing plate 22 provides sufficient adjustment for the driving roller 25 to secure the desired adjustment of the belt 35, as will be understood. The mounting of the conveyer unit on the grading vehicle between the grading plow and the main conveyer constitutes one of the features of our above mentioned copending application, Serial No. 699,860, in which application this mounting of the conveyer is specifically described and claimed. Such mounting, in and of itself, does not constitute a part of the present invention, and accordingly the same will only be described in brief. The shoe 34 at the lower end of the conveyer unit is provided with a laterally projecting eye member 51 which embraces and is free to slide vertically along a yoke member 52 secured to the plow unit, such plow unit being generally indicated in Fig. 1 at 53. This connection 51—52 permits the shoe 34 to slide along the roadway while still maintaining a definite relation between the plow and the lower end of the conveyer unit. The upper end of this subsidiary conveyer unit is supported on the main conveyer, generally indicated at 54, by pins 55 disposed at opposite sides of the subsidiary conveyer and engaging in longitudinal slots 56 in the bearing plates 18. The pin 55 at the rear side of the subsidiary conveyer is supported on two straps or bars 57 and 58 which are secured to the main conveyer 54. The corresponding pivot pin 55 at the front side of the subsidiary conveyer is also carried by the main conveyer 54 through a suitable bar or bracket securing such pin thereto. By virtue of the pin and slot connections 55—56 the subsidiary conveyer is capable of limited longitudinal movement in a direction transversely of the vehicle without disturbing the position of the main conveyer 54. The drive to the upper roller 25 is through a universally jointed shaft 59, which permits such movement of the subsidiary conveyer.

Referring now to Figures 3 and 6, we have here shown a deflector designated generally at D, and comprising a plate bent to provide an H-shaped raised portion, between the parallel parts of which are depressed portions 36 constituting chutes which, as illustrated to advantage in Figure 4, are inclined in opposed directions and downwardly toward their free edges. In the applied position of the deflector D it is secured by means of bolts or other suitable fastening members to the frame F and in such manner that the chutes 36 are disposed between the parallel portions 15 and 16 and at opposite sides of the intermediate portion 17. As shown in Figure 4, the deflector is suitably disposed with respect to the frame F and is interposed between the upper and lower stretches of the belt 35, it being particularly noted that the width of the deflector is such that its side edges extend beyond the side edges of the belt 35 for a purpose which will be hereinafter described.

Secured to the lower transverse edge of the deflector plate D is a scraper blade B, the scraping edge of which is slightly spaced from the periphery of the roller 30 so that during rotation of the latter any earth which may have adhered to the surface thereof will be removed from the roller.

For supporting the upper stretch of the belt 35 and in a manner to prevent undue sagging thereof under the load of the earth deposited thereon, two rollers 37 and 38 are arranged transversely of the belt and directly beneath the upper stretch, as clearly shown in Figure 2. These rollers are rotatably supported from suitable brackets secured to the deflector plate D, and the positioning of the rollers is such that they contact with and are driven by the upper stretch of the belt. The lower roller 37 is mounted in a bracket 39, the construction of the latter being such as to co-operate with the roller in spanning the space between the upper stretch of the belt and the deflector plate D, and for the purpose of preventing the passage of earth upwardly beyond the roller.

To prevent the earth deposited on the belt being accidentally discharged from the sides thereof, we have provided guard plates 40 and 41 arranged at the side edges of the member and co-extensive in length therewith. The guard plate 40 is secured adjacent its upper end to an angle bar 42 and the latter, in turn, is secured to another angle bar 43 supported on the corresponding rod 20. The lower end of the guard plate 40 is secured to an angle bar 44 (Figure 1), and the latter, in turn, is bolted to the shoe 34. The guard plate 41 is secured adjacent its upper end to an angle bar 45 (Figure 4), the latter in turn being supported upon the corresponding rod 20. The lower end of the guard plate 41 is secured to an angle bar 46 bolted to the shoe 34. As clearly shown in Figure 4, the guard plates 40 and 41 extend inwardly so that their lower edges are disposed inwardly with respect to the edges of the belt 35, this arrangement being designed to prevent, as far as possible, the accidental discharge of earth from the sides of the belt.

The operation of the conveyor is as follows:

In the applied position of the conveyor as shown in Figure 1, it substantially maintains the inclined position shown, the driving roller 25 being driven in such direction that the belt 35 is continuously moved so that its lower stretch travels downwardly and its upper stretch upwardly, as indicated by the arrows in Figure 2.

As the grading and loading apparatus advances, which is in a direction transverse with respect to the conveyer, earth is dumped on the upper stretch of the belt 35 and under the movement of the latter is carried upwardly and discharged into the main conveyer of the apparatus. During this operation the dirt, dust and gravel crowd, sift and work past the guard plates 40 and 41 and downwardly toward the lower stretch of the belt 35. Part of this earth is caught on the deflector and falls clear of the lower stretch of the belt, but the remainder works in between the stretches of the belt, some depositing on the lower stretch and the remainder on the deflector D. That earth which is deposited on the lower stretch is carried downwardly around the idler roller 30 between the latter and the belt. However, as it comes over the roller it is removed therefrom by the scraper B, and as it accumulates on the scraper it is engaged by the upper stretch of belt and carried upwardly on the deflector plate D and finally deposited in the chutes 36, which latter, because of their inclination, permit the earth to gravitate to the sides of the conveyer and outwardly from between the stretches of the belt. The roller 37 is positioned to check the upward movement of the earth, and by virtue of its direction of rotation it functions to throw the earth back and downwardly, thus tending to keep it moving until it works its way into the chutes 36. Any earth which enters the conveyer between the upper stretch of belt and the deflector plate D at a point above the roller 37 ultimately finds its way into the chutes 36 and gravitates from the latter to the opposite sides of the conveyer so that it can fall clear of the lower stretch of the belt.

From the foregoing operation it will be manifest that we have provided a conveyer in which the earth handled by the conveyer and working its way between the stretches of the belt is automatically ejected therefrom so as to insure the proper uninterrupted operation of the conveyer.

Although we have herein shown and described only one form of conveyer embodying our invention, it is to be understood that various changes and modifications may be made herein without departing from the spirit of the invention and the spirit and scope of the appended claims.

We claim:

1. In combination, a conveyer including rollers and a belt trained about the rollers, an earth catching and deflecting plate disposed between the stretches of the belt and extending substantially from one roller to the other, said plate being spaced from the upper stretch of said belt and comprising an inclined portion for discharging earth outwardly from between the stretches of the belt, and a third roller engaging with the upper stretch of the belt for precipitating earth moved along by the under surface thereof upon said earth catching and deflecting plate.

2. In combination, a conveyer including rollers and a belt trained about the rollers, an earth catching and deflecting plate disposed between the stretches of the belt and extending substantially from one roller to the other, said plate being spaced from the upper stretch of said belt and comprising oppositely extending chute portions for deflecting earth outwardly from between the stretches of the belt, and a roller engaging the underside of the upper stretch of said belt for agitating and discharging earth down upon said plate.

3. In combination, a conveyer including rollers with one of said rollers elevated with respect to the other, and a belt trained about the rollers, means for catching earth deposited between the inclined stretches of said belt and causing the earth to gravitate outwardly between the stretches at points above the lower roller, and scraping means associated with the lower roller for removing earth from the roller in such a manner that the earth removed is moved upwardly by the upper stretch of belt and deposited on said earth catching means so as to ultimately gravitate outwardly from between the belt stretches.

4. In combination, a conveyer including rollers and a belt trained about the rollers, an earth catching and deflecting surface disposed between the stretches of the belt and extending substantially from one roller to the other, said surface being spaced from the upper stretch of said belt and comprising an inclined portion for discharging earth outwardly from between the stretches of the belt, and means for loosening the earth being moved along under the upper stretch of belt for discharge onto said surface.

5. In combination, a conveyer including rollers and a belt trained about the rollers, an earth catching and deflecting surface disposed between the stretches of the belt and spaced from the upper stretch, said surface comprising a laterally inclined portion for discharging earth outwardly from between the stretches, and means actuated by motion of the belt for precipitating earth moved along by the upper stretch of the belt down upon said surface.

6. In combination, a conveyer including rollers and a belt trained about the rollers, an earth supporting and deflecting plate disposed between the stretches of the belt and spaced from the upper stretch, said plate extending substantially from one roller to the other and comprising a laterally extending downwardly inclined surface for discharging earth outwardly by gravity from between the stretches, and mean for loosening the earth being moved along by the upper stretch of belt for discharge onto said surface.

7. In combination, a conveyer comprising rollers with one of said rollers elevated with respect to the other, and a belt trained about the rollers and movable so that the upper stretch travels upwardly, an earth supporting deflector between the stretches of belt having chutes extending downward toward the edges of the belt, and a scraper associated with the lower roller to remove the earth therefrom so that the upper stretch will carry the earth upwardly upon said deflector and deposit the same in the chutes thereof.

8. A combination as embodied in claim 7, wherein an additional roller is interposed between the deflector and upper stretch of belt so as to be driven by the latter and to check the upward movement of the earth and agitate the same, for the purpose described.

9. In combination, a conveyer including rollers with one of said rollers elevated with respect to the other and a belt trained about the rollers, means for catching earth deposited between the inclined stretches of the belt and causing the earth to gravitate outwardly from between the stretches at points above the lower roller, scraping means associated with the lower roller for removing earth therefrom so that the upper stretch of belt is utilized to elevate and deliver the earth to the first means, and means interposed between the upper stretch of belt and the first means and contacting with the upper stretch of belt for checking the upward movement of and agitating the earth removed from said roller.

10. In a conveyer, an H-shaped frame, and a deflector plate secured to the frame and having inclined chutes formed therein, said chutes being disposed between the parallel portions of the frame and at opposite sides of the medial or connecting portion of the frame.

11. In combination, a conveyer comprising a pair of rollers with one of said rollers elevated with respect to the other, an endless belt trained about the rollers, a frame upon which the rollers are mounted, said frame being interposed between the stretches of said belt, a deflector plate superposed on the frame and having oppositely inclined chutes between its ends, rollers supported on the deflector plate and having contact with the upper stretch of said belt, and a scraper blade secured to the deflector plate and associated with the lower roller for removing earth therefrom.

12. In combination, a conveyer comprising a pair of rollers, an endless belt trained about the rollers, a plate interposed between the stretches of said belt, bearings carried by said plate adjacent its ends for supporting said rollers, and an earth catching and deflecting surface associated with said plate for ejecting earth deposited between the stretches laterally from the conveyer.

13. In combination, a conveyer comprising a pair of rollers, an endless belt trained about the rollers, a frame interposed between the stretches of said belt, bearings carried by said frame for supporting said rollers, and a laterally extending downwardly inclined chute associated with said frame for deflecting earth outwardly from between the stretches of the belt.

14. In combination, a conveyer comprising a pair of rollers with one of said rollers elevated with respect to the other, an endless belt trained about the rollers, a frame interposed between the stretches of the belt, bearings carried by said frame adjacent its ends for supporting said rollers, adjustable means interposed between said frame and the bearings of one of said rollers for adjusting said roller, oppositely inclined chutes associated with said frame for deflecting earth outwardly from between the stretches, a third roller interposed between the upper stretch of the belt and said chute, and guide plates disposed above the upper stretch of the belt on each side thereof, said guide plates being carried by said frame.

15. In combination, a conveyer including rollers and a belt trained about the rollers, earth supporting means interposed between the stretches of the belt for supporting and gravitationally ejecting earth deposited thereupon, and a roller engaging with the under surface of the upper stretch of the belt for precipitating earth moved thereby down upon said last named means.

ROLLA A. MORTON.
EDWARD P. HENRY.